A. C. ZIERATH.
EXTENSION CRANK.
APPLICATION FILED APR. 23, 1910.

977,252.

Patented Nov. 29, 1910.

Witnesses:-

Inventor:
Augustus C. Zierath.

UNITED STATES PATENT OFFICE.

AUGUSTUS C. ZIERATH, OF LOS ANGELES, CALIFORNIA.

EXTENSION-CRANK.

977,252. Specification of Letters Patent. Patented Nov. 29, 1910.

Application filed April 23, 1910. Serial No. 557,294.

*To all whom it may concern:*

Be it known that I, AUGUSTUS C. ZIERATH, a citizen of the United States, residing at Los Angeles, in the county of Los Angeles and State of California, have invented a new and useful Extension-Crank, of which the following is a specification.

This invention relates to a crank which is extensible or adjustable to different lengths and the main object of the invention is to provide a crank of this character which is simple and cheap in construction and efficient and durable in operation.

The invention is intended particularly for use in connection with drilling rigs where it is necessary in some cases to provide for changing the stroke and in this connection the invention provides a crank which when adjusted to any given length acts substantially as a solid body and is not liable to work loose in the violent jarring of the apparatus.

Figure 1:
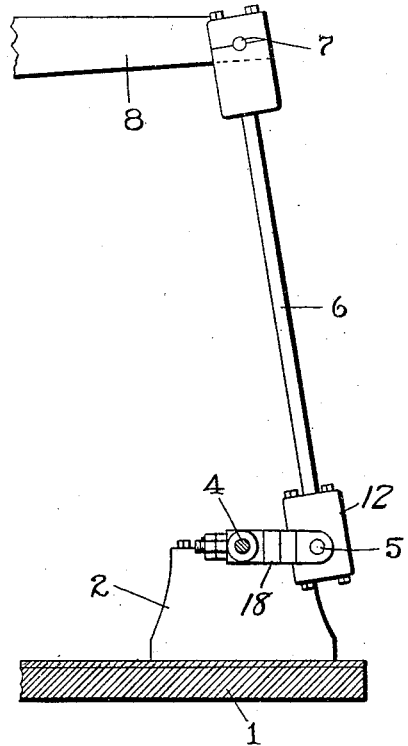
Figure 2:
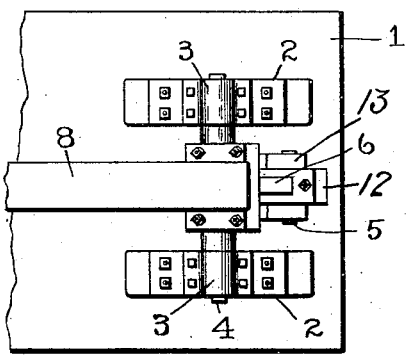
Figure 3:
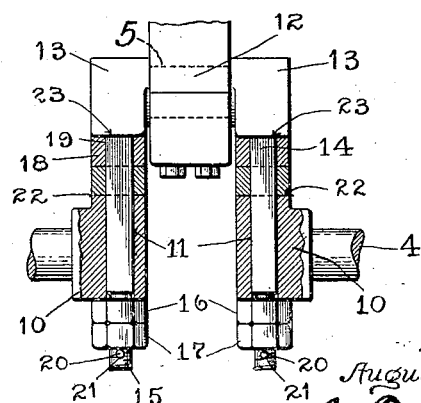

The accompaying drawings illustrate the invention and referring thereto: Figure 1 is an end elevation of a crank and mechanism connected thereto, showing the operating shaft and the supporting floor in section. Fig. 2 is a plan of the crank and connected mechanism. Fig. 3 is a side elevation of the crank, with parts in section.

Fig. 1 illustrates the application of the invention in connection with an oil drilling rig in which 1 designates a base on which is mounted a standard 2 provided with bearings 3 (see Fig. 2) for the shaft 4 on which is provided the extensible crank, said crank being connected by its wrist pin 5 with a link or the crank rod 6 having pivotal connection at 7 with the walking pin 8 or other means to be operated by the crank.

The shaft 4 is made in two portions journaled in the respective bearings 3, each shaft portion having a head 10 formed thereon, and each head 10 having a channel 11 extending transversely or diametrically therethrough. The crank comprises a U-shaped member having its central portion formed with a wrist pin 5 engaging a head 12 on the link 6 with an enlargement or head 13 at each end of said wrist pin and a bar 14 projecting from each head 13, the two bars 14 extending parallel to one another and at such distance apart as to enter the respective channels 11 in the shaft heads 10. Said bars and channels may be rectangular in cross section and closely fitting one another, the ends of the bars 14 being reduced and screw-threaded as shown at 15 to receive fastening nuts 16 and lock nuts 17. Spacers or washers 18 are interposed between the shaft heads 10 and the wrist pin heads 13, said spacers having central channels 19 fitting the crank bars 14, any suitable number of these spacers being used according to the distance to which the crank is to be extended. Flat shoulders 22, 23 are formed on heads 10 and 13 to serve as bearing faces for said spacers.

If the crank is to be shortened the nuts 16 and 17 are removed and the U-shaped member slipped from the shaft heads 10 and one or more of the washers 18 are then removed from each side of said U-shaped member and said member then replaced and fastened by means of the nuts 16 and 17 so as to bind the parts tightly together. If it is desired to lengthen the crank, the U-shaped member is separated as stated and one or more additional washers are placed thereon at each side and the said member then replaced and fastened as before. When so fastened, the parts are held tightly in proper relation, the spacers 18 serving to firmly hold the wrist pin at the proper radial distance without dependence on frictional action. When the nuts have been secured as stated, cotter pins, indicated at 20, may be inserted in holes 21 in the screw-threaded portions 15 of the crank bars 14 to prevent the lock nuts from working loose, thereby insuring permanent rigid connection of the parts.

What I claim is:

1. An extension crank comprising two shaft portions formed with transverse channels, a U-shaped member formed with a wrist pin and with side bars fitting in said channels, said shaft portions and U-shaped member being provided with heads, spacing blocks surrounding said side portions of the U-shaped member and located between said heads to radially space the wrist pin on the U-shaped member, and means for securing said side bars of the U-shaped member to said shaft portions.

2. An extension crank comprising two shaft portions formed with transverse channels, a U-shaped member formed with a wrist pin and with side bars fitting in said channels, said shaft portions and U-shaped member being provided with heads, spacing blocks surrounding said side portions of the U-shaped member and located between said heads to radially space the wrist pin on the U-shaped member, means for securing said side bars of the U-shaped member to said shaft portions comprising screw-threaded portions on said side portions of the U-shaped member, and nuts engaging said screw-threaded portions and said shaft portions.

In testimony whereof, I have hereunto set my hand at Los Angeles, California, this 16th day of April, 1910.

AUGUSTUS C. ZIERATH.

In presence of—
FREDERICK G. LYON,
FRANK L. A. GRAHAM.